Dec. 8, 1964     H. C. FLATON ETAL     3,160,112
CHECK VALVE AND APPLICATION THEREOF

Original Filed July 31, 1958     4 Sheets-Sheet 1

Fig. I

INVENTORS
Howard C. Flaton &
John P. Thorel
BY
ATTORNEY

United States Patent Office 3,160,112
Patented Dec. 8, 1964

3,160,112
CHECK VALVE AND APPLICATION THEREOF
Howard C. Flaton and John P. Thorel, Monroeville, Pa., assignors to Westinghouse Electric Corporation, East Pittsburgh, Pa., a corporation of Pennsylvania
Original application July 31, 1958, Ser. No. 752,342. Divided and this application May 23, 1962, Ser. No. 197,147
4 Claims. (Cl. 103—228)

This application is a division of application, Serial No. 752,342, filed July 31, 1958 and entitled "Check Valve." A continuation application Serial No. 208,289, filed July 9, 1962 has also been filed on the aforesaid application Serial No. 752,342, filed July 31, 1958 and the parent appication is now abandoned.

The present invention relates to a check valve of a streamlined center-guided design and particularly to a valve of the character described adapted for use within the inlet or outlet ports of certain types of fluid handling equipment and adaptable for operation in a variety of fluid flow conditions.

In known types of check valves, the valve seating member usually is furnished in the form of a flapper or the like operable by gravity or by reverse fluid flow to close the check valve. The prior valves, however, due to their structure, cause considerable pressure drop in the fluid system in which they are employed. Moreover, when actuated by a reverse fluid condition having a relatively steep wave front, these valves usually tend to slam, with resultant damage to the component parts of the valve, the entire fluid system, and instrumentation associated with the system. As a result of slamming, prior check valves frequently wear rapidly and fail to reopen when forward fluid pressure is reestablished.

In many of the known check valves, a spring or other biasing means is employed to urge the valve to its closed position and the valve is maintained at its open position only when fluid is circulated in the forward direction through the system, as by suitable pumping means or the like. Under conditions of no flow, then, the check valve would be closed. In certain applications, for example in supplying a coolant medium to a source of heat for purposes of extracting power therefrom or of cooling the source of heat, it is desired to permit the check valves to remain open under conditions of substantially no flow in order that residual heat can be removed from the heat source by the well-known thermosyphoning phenomenon. The relatively small flow occasioned in the cooling fluid by thermosyphoning would not induce sufficient pressure to open many types of conventional check valves which are biased as aforesaid to their closed positions.

On the other hand, by proper selection of a spring associated with the check valve of the invention and by providing certain clearances or orifices at mating parts of the check valve, a time delay either in opening or closing the check valve can be obtained. In certain arrangements of the check valve, a biasing spring if employed therewith is completely captivated or enclosed within portions of the check valve to eliminate any possibility of loss or of damage thereto by any foreign objects within the system.

The check valve of the invention can be cooperatively associated with various fluid handling apparatus, for example a pump of the impeller or centrifugal type such as that described and claimed in copending applications of O. P. Steele III et al., Serial No. 637,210, filed January 30, 1957, now Patent 2,964,659 issued December 13, 1960; G. E. Bollibon et al., Serial No. 758,809, filed September 3, 1958, now Patent 2,972,309 issued February 21, 1961; and of G. E. Bollibon et al., Serial No. 747,771, filed July 10, 1958, now Patent 3,013,500 issued December 19, 1961, all of which are assigned to the present assignee. When employed in this fashion, the check valve, because of its streamlined and center-guided characteristics, cooperates with the pump casing to control the entrance or suction flow characteristics of the pump and to assure the proper velocity transition from the suction port of the pump to the eye of its impeller. In the latter-mentioned installation, the check valve is disposed so that accidental disassembly of certain components of the pump, such as the means mounting the impeller on the pump shaft, during operation positively is prevented. The presence of the check valve also deflects foreign objects in the system which otherwise may reach and damage the pump impeller. The structure of the check valve is arranged so that the inlet piping of the pump can be furnished with a relatively large size in order to provide complete structural support for the pump and the driving mechanism frequently associated therewith. As will be demonstrated presently, enlargement of the inlet piping for this purpose can be accomplished in accordance with the invention without detriment to the hydraulic efficiency of the pump.

In view of the foregoing, an object of the invention is the provision of a check valve adapted for use within the inlet or outlet port of fluid-handling apparatus.

More specifically, it is an object of the invention to provide a check valve adapted for installation within the suction port of a pump.

Yet another object of the invention is the provision of a pump or motor-pump unit having an integral check valve cooperatively mounted in the inlet or suction port thereof.

Still another object of the invention is the provision of a motor-pump unit having an integral check valve mounted in its suction port and having a suction port of sufficiently large diameter or size such that the motor-pump unit can be mounted or supported entirely by its own inlet or suction piping.

Still another object of the invention is the provision of the motor-pump unit having combined therewith an integral check valve which, in addition to its normal function, cooperates with the pump to control the entrance flow characteristics of the pump and its impeller and to prevent accidental disassembly of component parts of the pump during operation thereof.

A further object of the present invention is the provision of a novel and efficient check valve.

The foregoing and additional objects, features and advantages of the invention will be elaborated upon during the ensuing description of exemplary modifications of the invention, with the description being taken in conjunction with the accompanying drawings, wherein.

As used herein, the term "annular" is defined to be descriptive of a member having a substantially central opening therein, such as a ring-shaped member. However, the shape of such annular member should not be interpreted to be limited to a member of circular cross section having a circular central opening. Rather it is specifically intended to include members and openings of different, and even irregular, cross sectional configurations.

Figure 1:
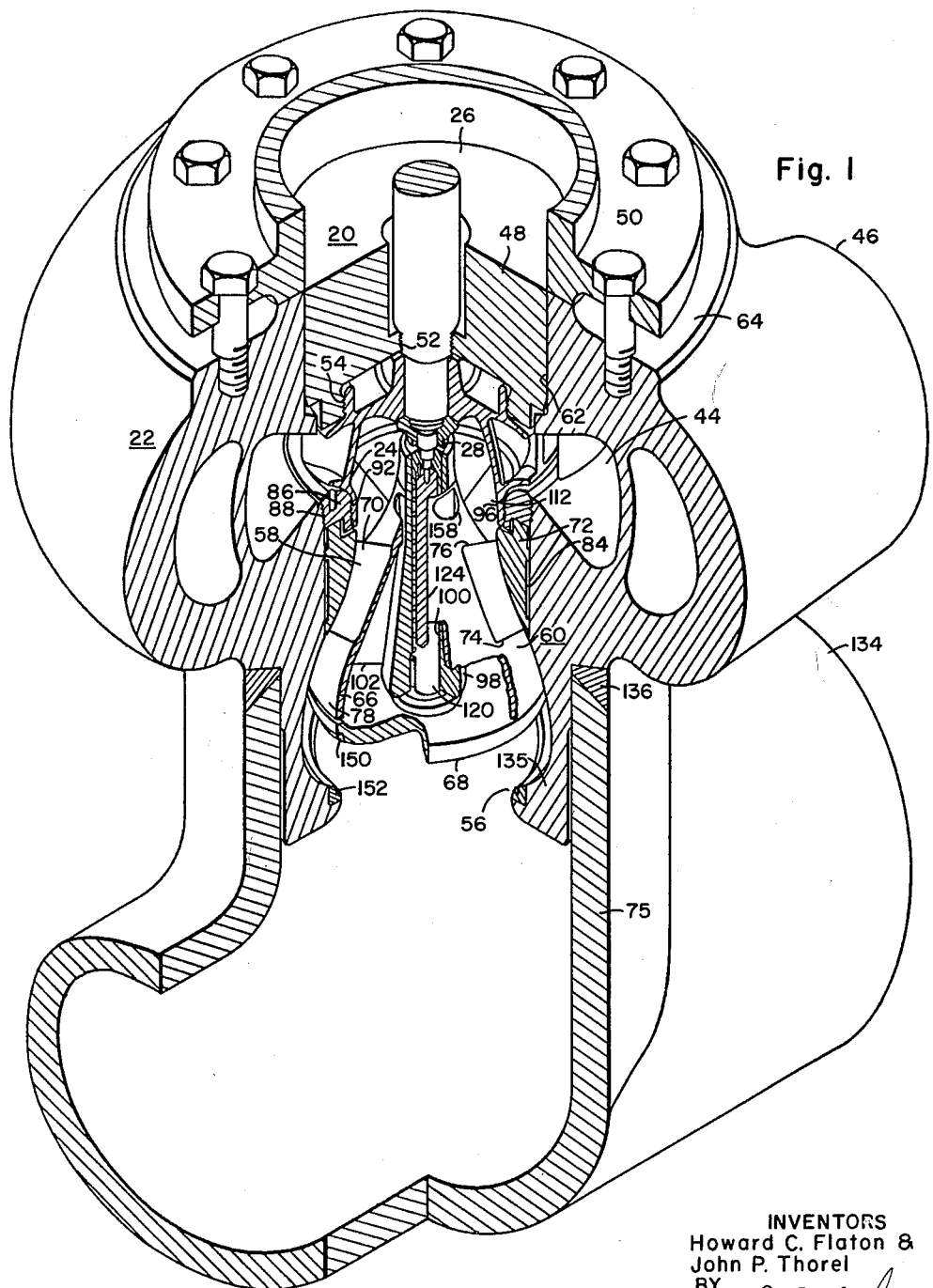
FIGURE 1 is an isometric view of a portion of a motor-pump unit having an integral check valve mounted in its pump casing and arranged in accordance with the invention, with portions of the unit having been removed and other portions broken away for purposes of clarity.
Figure 2:
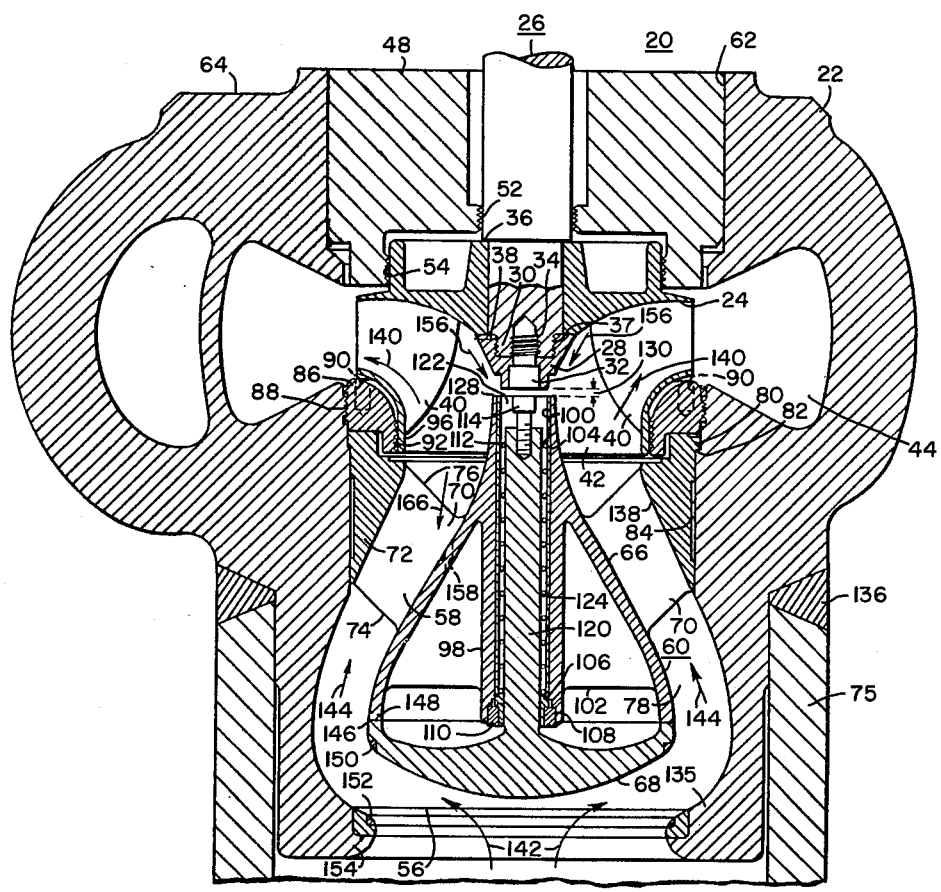
FIG. 2 is a partial longitudinally sectioned view of the motor-pump unit illustrated in FIG. 1 of the drawings.

Referring now to FIGS. 1 and 2 of the drawings, the check valve of the invention is shown in a novel combination with a pump or motor-pump unit denoted generally by the reference character 20. The pump 20 includes a hollow pump casing 22 in which is mounted an impeller 24. The impeller is secured to a driving shaft 26 by means of an impeller nut 28 which is threaded at 37 onto the lower end portion 30 of the driving shaft 26, as viewed in FIGS. 1 and 2. Loosening of the impeller nut 28 is prevented usually by a cap screw 32 which is threaded into the shaft 26 as denoted by the reference numeral 34. When thus positioned, the impeller 24 is retained by engagement with an annular shoulder 36 on the driving shaft and with overhanging portion 38 of the impeller nut 28.

The impeller 24 is conventional in construction and includes a plurality of vanes 40 which, when the impeller 24 is rotated by the shaft 26, draw fluid into the eye 42 of the impeller and impel the fluid at a higher head into a pumping volute 44 formed within the pump casing 22. From the volute 44 the fluid being pumped is transmitted to an outlet conduit or port 46 which communicates with the volute 44. The volute 44 also is of known design and is formed with a generally spiral configuration to aid in developing heat in the fluid being pumped. In one arrangement the pump 20 is joined to a suitable driving mechanism, for example, an electric motor (not shown) adapted to impart rotative movement to the driving shaft 26. In this arrangement, a thermal barrier or other closure member 48 is disposed generally between the pump casing and the housing 50 of the aforementioned electric motor. A suitable form of thermal barrier is described and claimed in the aforementioned copending application of G. E. Bollibon et al, Serial No. 747,771, filed July 10, 1958, now Patent 3,013,500, issued December 19, 1961 and assigned to the present assignee. As explained therein, the thermal barrier 48 includes a pair of labyrinthine seals 52 and 54 which are disposed in proximity to the driving shaft 26 and to the impeller 24 to minimize leakage at these rotating components.

The lower end of the pump casing 22 terminates in a suction port 56 for the pump 20. The suction port 56 communicates with the interior of the pump casing 22 through an opening 58 of sufficient diameter to permit insertion of a check valve 60 fabricated in accordance with the invention and mounted within the suction port 56 of the pump 20. An additional opening 62 is provided in the top wall portion 64 of the pump casing 22 in which the aforementioned thermal barrier or closure 48 is mounted. The opening 62 is large enough to permit insertion and removal of the impeller 24, the thermal barrier 48 and associated components of the motor-pump unit.

However, before inserting the thermal barrier 48 and the impeller 24 within the pump casing 22, the check valve 60 is first mounted within the suction port 56 of the pump casing. The check valve 60 is generally similar to the check valves which have been described in connection with the aforesaid patent application, Serial No. 752,342, filed July 31, 1958 and upon which the instant application is based. In this arrangement of the invention, then, the check valve 60 comprises a flared valve housing 66 and a valve disc 68. The valve housing 66 is secured to a plurality of stationary supporting ribs 70 which in turn are joined to an annular supporting member 72, as by integrally casting or by welding. The ribs 70 are made relatively thin and are provided with rounded and tapered edge portions 74 and 76 in order to reduce the resistance to fluid flow through the annualr space 78 existing between the check valve 60 and the interior surface of the suction port 56. The ribs 70 serve the added function of minimizing or preventing impeller suction whirl and thus permits the impeller to be loaded uniformly. The pump, accordingly, is adaptable for use in a greater latitude of suction conditions, for example near a constriction or elbow (not shown) in the suction conduit 75 without imparting fluid unbalance and resulting vibration to the impeller 24.

The annular supporting member 72 is closely fitted within the lower opening 58 of the pump casing 22 and is supported therein by means of an outwardly extending flange 80 and an inwardly extending shoulder 82 formed respectively on the annular member 72 and on the wall surface of the opening 58, as shown in FIG. 2. A rather shallow, broad annualr groove 84 is formed in the outer peripheral surface of the supporting member 72 in order to reduce the area of contact thereof with the adjacent portion of the pump casing 22, and resultantly to reduce friction between the supporting member 72 and the pump casing 22 and to reduce close-tolerance machining costs.

The supporting member 72 is retained within the opening 58 by means of an annular nut 86 which is threaded to a tapped inner portion 88 of the casing opening 58. Desirably the annular nut 86 is provided with at least two indents 90 whereby a suitable tool can engage the annular nut 86 for manipulating the same. In this arrangement, the annular nut 86 is provided at its inner periphery with a labyrinthine seal 92. The seal in this example comprises a plurality of circumferential, closely spaced parallel grooves with the result that a plurality of closely spaced ridges are formed at the inner periphery of the annular nut. These ridges are disposed in close proximity to the adjacent eye portion 96 of the impeller and thereby minimize or prevent leakage of relatively higher pressure fluid from the volute 44 of the pump casing into the suction port 56 of the pump 20.

The valve housing 66 is provided with a hub member 98 having a central longitudinal opening 100 extending therethrough. The flared skirt of the housing 66 is stabilized by the hub 98 and by a plurality of generally triangular ribs 102 which are welded to or formed integrally with the housing 66 and the hub 98. In this arrangement, four of the ribs 102 are employed and are disposed substantially at right angles to one another.

A sleeve member 104 (FIG. 2) is closely fitted within the cavity 100 and extends substantially coextensively therewith. The sleeve 104 is positioned within the cavity 100 by means of an offset portion 106 formed thereon adjacent the lower end of the sleeve 104, as viewed in FIG. 2 of the drawing. A complementary offset portion 108 is formed on the lower end of the hub 98 and the sleeve 104 is retained in this position by means of an annulus 170 seated in a groove formed by the cooperating offset portions 108 and 106 furnished respectively at the lower ends of the hub 98 and the sleeve 104. The annulus 110 desirably is retained in its groove by means of welding.

The valve disc 68 is provided with stub shaft 120 slidably mounted within the sleeve 104. The stub shaft 120 is provided with an end cap 122 which extends outwardly toward the sleeve 104 to provide an outward shoulder 112. The end cap 122 is secured to the end of the stub shaft 120 by suitable means such as cap screw 114. The valve disc 68 is urged toward its open position by means of the compressional spring 124 which is mounted within the sleeve 104 between the shoulder 112 and the offset 106 of the end cap 122 and the sleeve 104, respectively. The position of the valve disc 118 at no flow ranges from complete closure, by virtue of the weight of the disc 118, to fully open position, depending upon the strength of the spring 124.

When the valve 60 and associated components are positioned within the pump casing 22 by means of the annular supporting member 72, the upper or reduced end 128 of the valve housing 66 is disposed in proximity to the impeller nut 28 and the retaining screw 32. The clearance 130 existing between the upper end 128 of the valve and the impeller nut 28 is sufficient to allow for manufacturing tolerances of the pump 20 and valve 60 but is close enough so that the nut 28 positively cannot be removed from a threaded end 30 of the driving shaft when the pump and valve have been assembled. More specifically, the clearance 130 is sized to be smaller than the length in the axial direction of the thread 37.

As better shown in FIG. 1 of the drawings, the suction port 56 of the pump 20 has been considerably enlarged in order to accommodate the largest diameter of the check valve 60 as represented by the valve disc 68. The suction port 56 is made sufficiently large so that the inlet annular passage 78 noted heretofore is of adequate size for the eye 96 of the impeller 24. The suction port 56 in this arrangement is fitted closely within a connecting conduit portion 75, which portion is coupled to the system conduit 134 (FIG. 1). The diameters of the suction port 56 and of the connecting conduit 75 due to the presence of the integral check valve 60, can be made sufficiently large in order to provide adequte support for the pump 20 and the aforementioned driving means secured thereto. The pump and driving mechanism are stabilized in this position by insertion of lower portion 134 of the suction port 56 into the upper end of the connecting conduit 75. When thus positioned, the conduit 75 is hermetically sealed to the pump casing 22 by means of an annular sealing and structural weld 136.

As better shown in FIG. 2 of the drawings, the shape of the valve disc 68 and the configuration of the valve housing 66 cooperate to form substantially a tear-drop design and consequently to form a smooth annular channel 78 between the valve 60 and the suction port 56. As the channel 78 decreases in diameter toward the upper end 128 of the check valve, the radial thickness of the channel is increased in compensation. The smooth contour of the internal surface of the suction port 56 is maintained by the tapered surface 138 of the supporting member 72 to which the ribs 70 are secured.

As indicated previously, the annular channel 78 is reduced toward the impeller 24 until the channel 78 adjacent the impeller 24 has approximately the same outer diameter as the internal diameter of the impeller eye 42. From this point the fluid follows the normally smooth curve or path through the impeller 24 as denoted by flow arrows 140. The upper end 128 of the housing 66 and the outer periphery of the impeller nut 28 similarly are shaped so that a smooth curve is formed by these portions and by the adjacent areas of the impeller 24 and the valve 60, so that fluid enters the impeller with a minimum of turbulence.

With this arrangement the fluid entering the pump as denoted by flow arrows 142 is conducted smoothly around the check valve housing as denoted by flow arrows 144 and finally into the impeller eye as denoted by the aforementioned flow arrows 140. The aforementioned contour of the check valve 60, the impeller nut 28 and the impeller itself are arranged to conduct fluid from the connecting conduit 75 to the impeller with minimal turbulance, reduction, friction, and velocity-fluctuation losses. The use of the check valve 60 when mounted in this fashion also permits the use of a large-diameter connecting conduit 75 and suction port 56 due to the presence of the check valve 60. If the check valve 60 were not employed, the conduction of fluid from a large inlet conduit such as the conduit section 75 to the relatively smaller impeller eye 42 would decrease the pump efficiency to a considerable extent due to increases in the aforementioned losses. With the check valve and pump arrangement of the invention, however, the pump 20 can be entirely supported by the conduit section 75 and yet the fluid handled by the pump is conducted smoothly from the enlarged conduit section 75 to the relatively smaller impeller.

The fact that the pump 20 and its associated driving mechanism can be supported entirely by the conduit section 75 and hence by the system conduit 134 is particularly important in connection with high temperature systems which cause severe thermocycling in the system conduit 134 when starting up or shutting down the high temperature system. If the motor pump had to be mounted more or less independently of the conduit 134, some means would have to be associated with the mounting to permit movement of the mounting and pump as the conduit 134 expanded and contracted. However, with the pump 20 and associated components supported directly by the conduit 134, the pump is free to move at all times with the conduit 134.

The operation of the check valve 60 is similar to that described in connection with the acceleration-sensitive valve of the aforesaid parent application and need not be further described in detail. The valve 60 then is biased to its fully open position whereat the upper edge 146 of the valve disc bears against the lower edge 148 of the housing 66. Upon closing the check valve, the valve disc 68 is driven downwardly against the action of the relatively small compressional spring 124 until the seating area 150 of valve disc 68 engages a valve seat 152 disposed in an offset portion 154 adjacent the lower extension 138 of a suction port 56. In this arrangement, the valve 60 is responsive to a sudden increase in reverse pressure applied as indicated by flow arrows 156 to the upper end of the drive shaft cap 122. This pressure also is transmitted through a plurality of generally vertical openings 158 extending through the wall of the valve housing 66 as denoted by flow arrows 160. As better shown in FIG. 1 of the drawings, four such openings 158 are employed. In this arrangement, the check valve 60 will remain open under conditions of no flow, due to the upward force on the valve disc 68 imparted by the spring 124.

Alternatively, the valve disc 68 can be biased to its closed position against the valve seat 152 by provision of a biasing or compressional spring disposed between the hub 98 and the valve disc 68.

Figure 3:
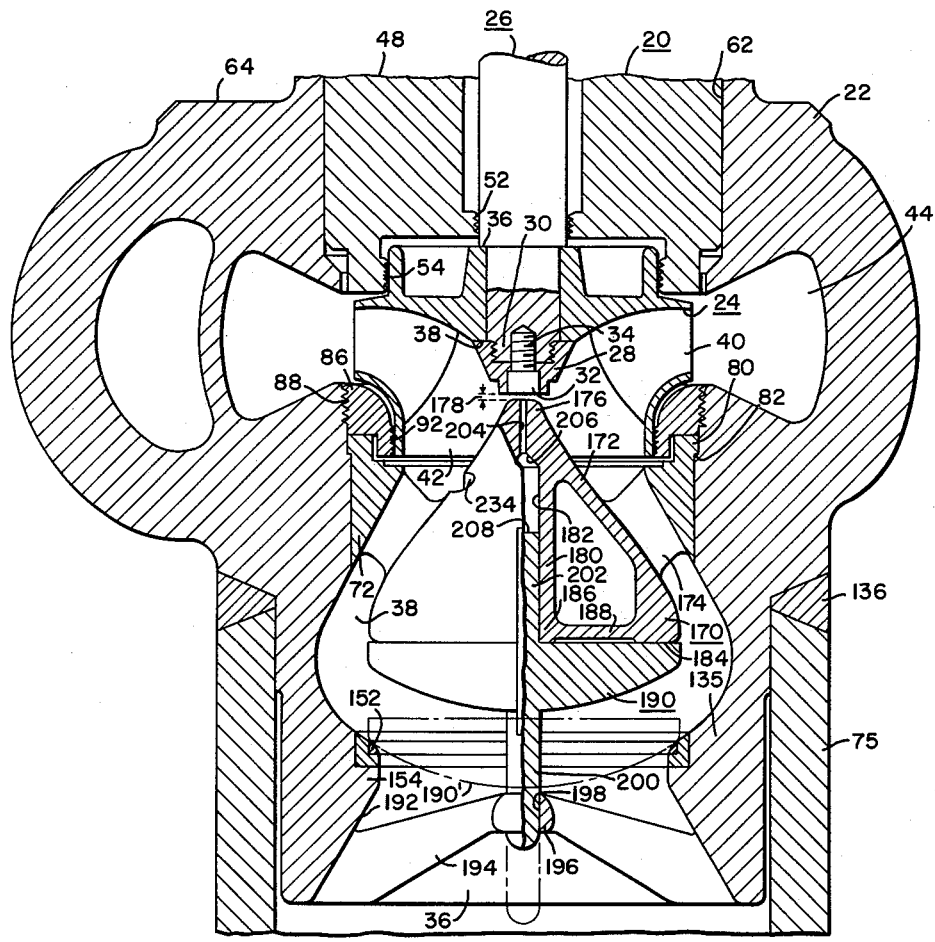
FIG. 3 is a sectional view of another motor-pump unit having another type of check valve integrally mounted in the pump case and arranged in accordance with this invention.
Figure 4:
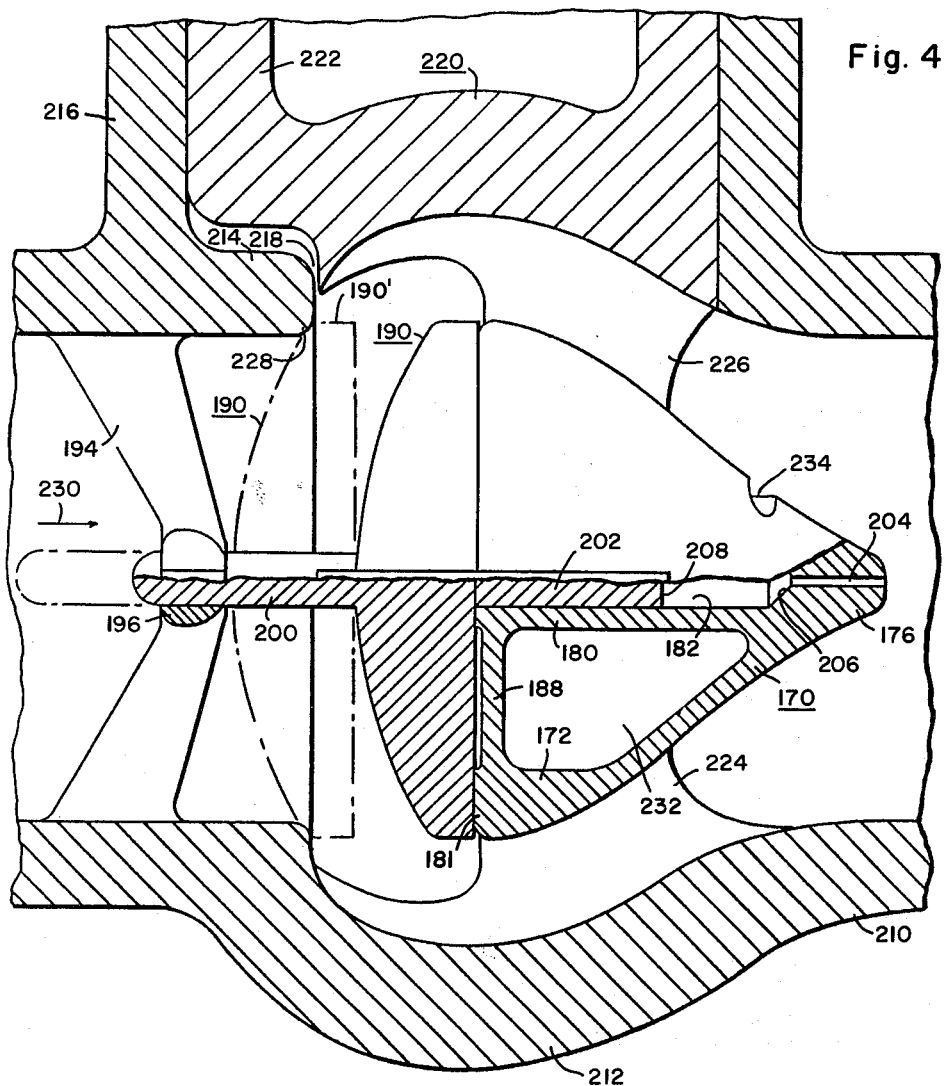
FIG. 4 is an enlarged sectional view of the check valve of FIG. 3 and mounted in a tubular conduit.

Referring now to the embodiments of this invention illustrated in FIGS. 3 and 4, it will be noted that a check valve of the center-guided type with a movable valve disc having two bearing points is illustrated in FIGS. 3 and 4. In FIG. 3, the latter check valve is shown in combination with a fluid handling device or pump in substantially the same manner as the check valve 60 and the pump 20 of FIGS. 1 and 2. Accordingly, in connection with FIG. 3 like parts will be identified by the same reference characters utilized in conjunction with FIGS. 1 and 2 and will not be described in detail again.

Referring now specifically to FIG. 3, a check valve 170 is mounted in the openings 58 of the pump casing 22 between the suction port 56 of the pump 20 and the impeller eye 42. The check valve 170 includes a flared annular housing 172 fixedly disposed in the opening 58 by ribs 174, similar in construction to the ribs 70 of the embodiment illustrated in FIGS. 1 and 2. The flared annular housing 172 of the check valve 170 is formed with its narrowed upper end 176 disposed closely adjacent the lower surface of the impeller nut 28 and desirably having a clearance 178 between the end 176 and the lower surface of the impeller nut 28 of a size smaller than the length in the axial direction of the thread 37. In this manner, loss of the impeller nut 28 by means of its complete unthreading from the shaft 26 is prevented.

The flared annular housing 172 is provided with a centrally disposed annular hub 180 therein having its central opening 182 exposed to the exterior of the housing 172 adjacent the lower or flared end 184. The lower end 186 of the hub 180 is secured to the lower end 184 of the flared housing 172 by a plurality of radially extending ribs 188 which may be formed integrally therewith or secured by suitable means as by welding. A movable valve disc 190 is mounted adjacent the lower or flared end 184 of the housing 172 for reciprocal movement between the end 184 and the valve seat 152 formed adjacent the lower end of the pump casing 22 on the offset portion 154.

The lower end of the pump casing 22 below the offset portion 152 is further tapered outwardly at 192 so that the offset 152 forms a streamlined or venturi type flow conduit. A plurality of radially extending ribs 194 are mounted on the tapered portion 192 of the pump casing 22 and extend inwardly to form an annular bearing member 196. The bearing member 196 desirably is provided with its central opening 198 disposed in alignment with a downwardly extending stub shaft 200 formed on the lower surface of the valve disc 190. The stub shaft 200 is mounted in the central opening 198 for reciprocal movement therein to provide a bearing point for the valve disc 190.

The radial ribs 194 desirably are shaped similarly to the ribs 174 to permit streamlined flow therepast and minimizing a pressure drop thereacross. It is to be noted that the tapered portion 192 of the valve housing 22 also is formed to permit streamlined flow with a minimized pressure drop.

The flared housing 172 and the valve disc 190 are shaped to fit complementarily within the opening 58 in the same manner as the flared housing 66 of FIGS. 1 and 2. In addition to the stub shaft 200 which provides one bearing point for the valve disc 190, the valve disc 190 is also provided with a second or upwardly extending stub shaft 202 which is closely received by the opening 182 in the hub 180. The stub shaft 202 and the hub 180 form a second bearing point for the valve disc 190. Accordingly, the valve disc 190 is movable reciprocally between the lower end 184 of the housing wherein the valve is in the open position, and the valve seat 152 wherein the valve is in the closed position, as illustrated in dot-dash lines in FIG. 3. Reciprocal movement of the stub shaft 202 within the hub 180 is assisted by the provision of an axially extending opening 204 in the narrowed end 176 of the valve housing 172. The opening 204 provides communication between the upper end for hub opening 182 and the interior of the impeller 24.

The FIG. 3 embodiment of this invention provides the valve disc 91 in a position wherein upon fluid flow through the intake port 56 of the housing 22, and the force of the fluid moves the valve disc upwardly into engagement with the surface 184 of the housing 172. This fluid force acts solely against the weight of the disc 190 to move the latter to the position shown in FIG. 3. Upon no flow or reverse flow condition, the weight of the valve disc 190 moves the valve to the completely closed position as shown by the dot-dash lines 190' in FIG. 3. In furtherance of this purpose the opening 204 prevents the creation of partial vacuum or the like on the upper end of the stub shaft 202. Moreover, openings such as the openings 158 may be provided in the flared housing 158 of FIGS. 1 and 2 to assist in the instantaneous downward movement of the valve disc 190 upon reverse flow conditions.

Furthermore, in this arrangement of the invention, if an additional initial force is desired to move the valve downwardly upon no flow or reverse flow conditions, a resilient means (not shown) may be inserted in the opening 182 to react between the surfaces 206 and 208 of the housing 172 and the stub shaft 202, respectively. Resilient means located in the last-mentioned position will, of course, still permit the location of the end 176 of the valve 170 in close proximity with the impeller nut 28.

Referring now to the embodiment of this invention illustrated in FIG. 4, the check valve of FIG. 3 is illustrated in another applicative background, that is to be disposed in a substantially horizontally extending conduit. Accordingly, a conduit or outer enclosure 210 of annular configuration is provided with a generally bubbled or flared portion 212 disposed in alignment with the check valve 170. The shape of the flared portion 212 is predetermined to reduce the pressure drop in the conduit 210 across the check valve 170. The conduit 212 is desirably provided with a partially open side 214 having a generally annularly upstanding portion 216 formed integrally thereon and surrounding the opening 218 in the side 214. A cover member illustrated as 220 desirably is disposed in the opening 218 and is closely received by the tubular upstanding portion 216. The cover member is provided with an upstanding annular side 222 which is formed to extend substantially parallel to the upstanding portion 216. The cover 220 desirably is secured to the conduit 210 by suitable means (not shown) such as by a peripheral weld between the upstanding portions 222 and 216. Streamlined ribs 224, only one of which is shown in FIG. 4 may be mounted in the conduit 212 by suitable means or may be cast integrally therewith for supporting the flared housing 172 of the check valve fixedly in position. One of the ribs 226 desirably is secured at one end to the cover 220 and extends downwardly to the conduit 210 to engage the adjacent side of the housing 172. In operation and function, the check valve of FIG. 4 is substantially the same as that illustrated in FIG. 3. Accordingly, like parts will be designated by the same reference characters with no further description thereof being given. The valve 170 of FIG. 4 is provided with its valve disc 190 mounted at two bearing points for reciprocal movement between the end 184 of the housing 170 and a valve seat 228 formed on the inner surface of the conduit 210 adjacent one end of the flared portion 212 thereof. Upon flow and the direction indicated by the arrow 230 in the conduit 210, the valve disc 190 will be moved to the position shown in full in FIG. 4 with the disc being in engagement with the end 184 of the housing 172. Upon no flow or reverse flow conditions, the valve disc 190 may be either in the completely open position or in the completely closed position, illustrated in the dot-dash lines 190' of FIG. 4 depending upon the needs of the system. For example, if at no flow, it is desired that the valve 170 be completely closed, a resilient means such as a spring (not shown) may be placed either in the opening 182 and compressed between the surfaces 206 and 208 or may be compressed between the ribs 188 and the juxtaposed surface of the valve disc 190. If it is desired that the valve remain open at the no flow condition, none of the aforementioned springs will be utilized. Upon reverse flow in the conduit 210 the valve disc 190 is moved to the closed position, shown by the dot-dash lines 190' of FIG. 4, by force of the fluid passing through the opening 204 in the narrow end 176 of the housing 172 and acting on the surface 208 of the shaft 202 together with the force of fluid which acts on the fluid entrapped in the area 232 of the housing 172 through the opening 234 in the housing 172.

We claim as our invention:

1. In combination, pumping means including a casing, an impeller mounted for rotation within said casing, said casing having an outlet port and a suction port, a center-guided check valve mounted within said suction port and spaced therefrom, said valve including a flared housing open at one end, a valve disc engageable with said open end at the open position of said valve and with a reduced portion of said suction port at the closed position of said valve, means for mounting said valve disc for coaxial movement relative to said housing and said suction port, said suction port communicating with the eye of said impeller, the inner surface of said port and the outer surface of said valve housing and valve disc being shaped to provide a smooth annular passage for liquid flowing through said suction port to said impeller eye, a driving shaft disposed in said casing and having one end thereof terminating adjacent said eye of said impeller, said impeller being mounted for rotation upon said driving shaft adjacent said one end, means coupled to said one end of said driving shaft for securing said impeller upon said driving shaft, said valve housing being disposed in proximity to but spaced from said one end of said driving shaft to prevent disengagement of said securing means during operation of said pumping means.

2. In a fluid pump, the combination comprising a pump casing, an impeller means disposed in said casing and having an intake port, shaft means for said pump, said shaft means at one end being secured to a portion of said impeller means for rotating the latter, said impeller portion being juxtaposed to said intake port and exposed thereto, securing means mounted on one of said shaft and impeller means for securing said shaft means to said impeller means and disposed between said impeller means portion and said intake port, a housing member disposed in said casing adjacent said intake port but in spaced relationship therewith and having one end thereof disposed closely adjacent said securing means, said one housing end being spaced a distance from said securing means and said one end of said shaft means to permit rotation of the latter without engaging said housing but being disposed sufficiently close thereto to prevent removal of said securing means from said one of said shaft and impeller means, said housing member being formed of a substantially tear drop configuration, and said pump casing adjacent said housing member being complementarily shaped to provide a flow path of low flow resistance adjacent said housing member.

3. In combination, pumping means including a casing, an impeller mounted for rotation within said casing, said casing having an outlet port and a suction port, a center-guided check valve mounted within said suction port and spaced therefrom, said valve including a flared housing open at one end, a valve disc engageable with said open end at the open position of said valve and with a reduced portion of said suction port at the closed position of said valve, means for mounting said valve disc for coaxial movement relative to said housing and said suction port, said means including a pair of laterally extending stub shafts secured to opposed surfaces of said valve disc, an annular hub member formed on said flared housing having the opening in said hub member facing said open end of said flared housing, one of said stub shafts being supportedly and slidably received in said hub member opening, a bearing member of annular configuration disposed in said suction port on the side of said reduced portion of said suction port remote from said impeller eye, the other of said stub shafts being supportedly and slidably received in the opening in said annular bearing member, said suction port communicating with the eye of said impeller, the inner surface of said port and the outer surface of said valve housing and valve disc being shaped to provide a smooth annular passage for liquid flowing through said suction port to said impeller eye, a driving shaft disposed in said casing and having one end thereof terminating adjacent said eye of said impeller, said impeller being mounted for rotation upon said driving shaft adjacent said one end, means coupled to said one end of said driving shaft for securing said impeller upon said driving shaft, said valve housing being disposed in proximity to but spaced from said one end of said driving shaft to prevent disengagement of said securing means during operation of said pumping means.

4. In combination, pumping means including a casing, an impeller mounted for rotation in said casing, said casing having a suction port, valve means mounted in said casing with at least a portion thereof disposed in said suction port, said suction port communicating with the eye of said impeller, a driving shaft disposed in said casing and having one end thereof terminating adjacent said eye of said impeller, said impeller being mounted for rotation upon said driving shaft adjacent said one end, means coupled to said one end of said driving shaft for securing said impeller upon said driving shaft, said securing means being exposed to said eye of said impeller, said valve means including a housing portion fixedly mounted in said casing and a valve disc portion reciprocally movable relative to said valve housing portion, said housing portion haing one end thereof defining one extremity of said valve means independently of the position of said valve disc portion, said one end of said housing portion being fixedly disposed in said impeller eye at a position in sufficient proximity to but spaced from said one end of said driving shaft to prevent disengagement of said securing means during operation of said pumping means.

References Cited in the file of this patent
UNITED STATES PATENTS

| | | |
|---|---|---|
| 1,097,297 | Callan | May 19, 1914 |
| 1,097,298 | Callan | May 19, 1914 |
| 1,448,717 | Slattery | Mar. 13, 1923 |
| 1,802,720 | Junkers | Apr. 28, 1931 |
| 2,102,289 | Smolensky | Dec. 14, 1937 |
| 2,170,478 | Long et al. | Aug. 22, 1939 |
| 2,357,527 | Lundquist | Sept. 5, 1944 |
| 2,431,398 | Hasbrouck | Nov. 25, 1947 |
| 2,459,815 | Hammell | Jan. 25, 1949 |
| 2,809,660 | Becker | Oct. 15, 1957 |
| 2,870,779 | Thomiszer | Jan. 27, 1959 |
| 2,957,424 | Brundage | Oct. 25, 1960 |

FOREIGN PATENTS

| | | |
|---|---|---|
| 196,608 | Great Britain | Apr. 17, 1923 |
| 328,835 | Great Britain | May 8, 1930 |